US011187827B1

(12) United States Patent
Stoneback et al.

(10) Patent No.: US 11,187,827 B1
(45) Date of Patent: Nov. 30, 2021

(54) SPINNING APERTURE NEUTRAL DRIFT SENSOR (SANDS)

(71) Applicant: Board of Regents, The University of Texas System, Austin, TX (US)

(72) Inventors: Russell A. Stoneback, Plano, TX (US); Michael D. Perdue, Dallas, TX (US); Rod Heelis, Plano, TX (US); Mark Mankey, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/938,666

(22) Filed: Jul. 24, 2020

Related U.S. Application Data

(60) Provisional application No. 62/879,124, filed on Jul. 26, 2019.

(51) Int. Cl.
*G01W 1/02* (2006.01)
*G01W 1/18* (2006.01)
*G01W 1/16* (2006.01)

(52) U.S. Cl.
CPC .............. *G01W 1/02* (2013.01); *G01W 1/18* (2013.01); *G01W 1/16* (2013.01)

(58) Field of Classification Search
CPC ............ G01W 1/02; G01W 1/18; G01W 1/16
See application file for complete search history.

(56) References Cited

U.S. PATENT DOCUMENTS

2017/0128746 A1* 5/2017 Zwart .................. A61N 5/1045

FOREIGN PATENT DOCUMENTS

| CN | 1248061 A | * | 3/2000 | |
| CN | 101990630 A | * | 3/2011 | ............. G01L 21/32 |
| CN | 103789743 A | * | 5/2014 | |
| JP | 2000100372 A | * | 4/2000 | ............. H01J 49/40 |

OTHER PUBLICATIONS

Spencer et al. (The neutral-atmosphere temperature instrument, Radio Science, vol. 8, No. 4, pp. 287-296, Apr. 1973) (Year: 1973).*
Rice et al. (Atmosphere Explorer pressure measurements: Ion gauge and capacitance manometer, Radio Science, vol. 8, No. 4, pp. 305-314, Apr. 1973) (Year: 1973).*
Spencer et al. (Thermosphere Zonal Winds, Vertical Motions and Temperature as Measured from Dynamics Explorer, Geophysical Research Letters, vol. 9, No. 9, pp. 953-956, Sep. 1982) (Year: 1982).*
Heelis, R.A., Stoneback, R.A., Perdue, M.D. et al. Space Sci Rev (2017) 212: 615. https://doi.org/10.1007/s11214-017-0383-3 (Year: 2017).*

* cited by examiner

*Primary Examiner* — Daniel R Miller
*Assistant Examiner* — Christian T Bryant
(74) *Attorney, Agent, or Firm* — Yee & Associates, P.C.

(57) ABSTRACT

A scientific instrument for measuring neutral atmospheric conditions at satellite altitudes is provided. In an illustrative embodiment, the scientific instrument includes an ion gauge configured to measure ion pressure. The scientific instrument also includes a lid covering the ion gauge. The lid includes a plurality of slits. The scientific instrument also includes an aperture plate that includes an aperture opening. The aperture plate is configured to rotate such that each of the slits are periodically exposed by the aperture opening to allow a neutral beam flux to enter the ion gauge.

20 Claims, 16 Drawing Sheets

SPINNING APERTURE NEUTRAL DRIFT SENSOR (SANDS)

BACKGROUND INFORMATION

1. Field

The present disclosure relates generally to atmospheric sensors and, more specifically, to systems, methods, and devices for measuring the neutral atmosphere at satellite altitudes.

2. Background

The Earth's neutral atmosphere has a dominant influence on the dynamics of the ionosphere, a charged region of the atmosphere at the boundary of space. Ionospheric dynamics are important as the motion and distribution of plasma in the ionosphere can disrupt the propagation of GPS and other communications signals between the ground and satellites, interfering with navigation and other aspects of modern society.

SUMMARY

In one illustrative embodiment, a scientific instrument for measuring neutral atmospheric conditions at satellite altitudes includes an ion gauge configured to measure ion pressure. The scientific instrument also includes a lid covering the ion gauge. The lid includes a plurality of slits. The scientific instrument also includes an aperture plate that includes an aperture opening. The aperture plate is configured to rotate such that each of the slits are periodically exposed by the aperture opening to allow a neutral beam flux to enter the ion gauge.

In another illustrative embodiment, a method for determining neutral atmospheric conditions at satellite altitudes includes rotating an aperture plate containing an aperture opening such that a number of slits in an ion gauge covering in a scientific instrument are successively exposed allowing a neutral beam flux into an ion gauge. The method also includes measuring pressures in the ion gauge over time. The method also includes determining cross-track winds using peaks in the pressure measurements in time.

In yet another illustrative embodiment, a computer program product for determining neutral atmospheric conditions at satellite altitudes, the computer program product comprising a non-transitory computer readable storage medium having program instructions embodied therewith, the program instructions executable by a computer to cause the computer to perform a method. The method includes causing an aperture plate containing an aperture opening to rotate such that a number of slits in an ion gauge covering in a scientific instrument are successively exposed allowing a neutral beam flux into an ion gauge. The method also includes obtaining pressure measurements in the ion gauge over time. The method also includes determining cross-track winds using peaks in the pressure measurements in time.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1A:
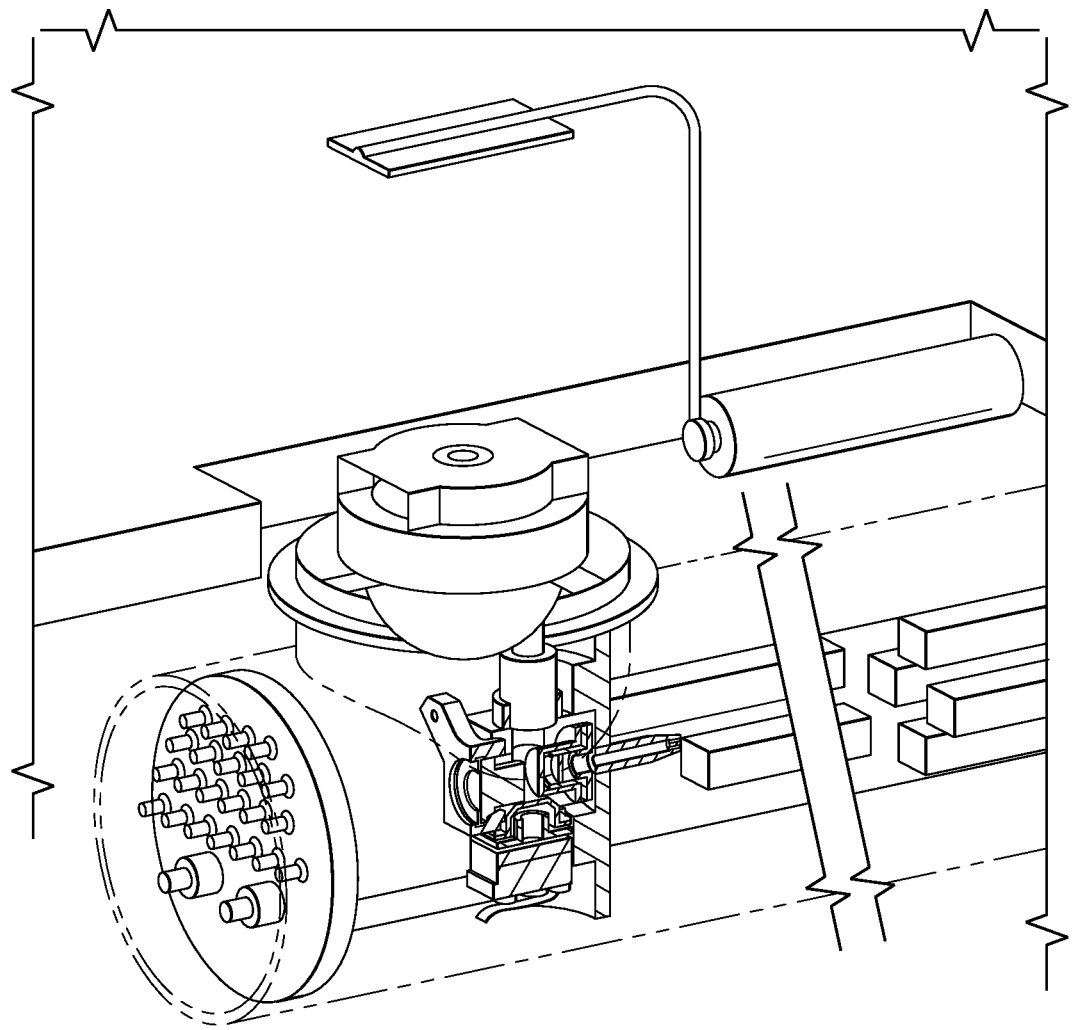
FIG. 1A is a diagram of a WATS Instrument.

The different illustrative embodiments recognize and take into account one or more different considerations. For example, the illustrative embodiments recognize and take into account that the key engineering challenges are 1) outgassing of the instrument components—motor, bearing, gearbox, 2) providing a constant speed motor (drift is okay as long as it is slow), 3) Rotating components—extensive life testing will be required. The availability of S/C missions able to fly in ram-pointing mode with pointing control, stability and knowledge required may be limited. The sensor must be coupled with a ram-wind detector to achieve full 3D wind vector. Competing remote-sensing techniques may be preferable to in situ measurements.

Embodiments of the disclosed sensor provide that when hosted on a satellite and pointed along the velocity direction, the sensor measures the local velocity of the neutral wind in the directions perpendicular to the spacecraft velocity direction. The Wind and Temperature Spectrometer (WATS) which was launched in the early 1980's on the Dynamics Explorer program is the only sensor, to my knowledge, known to have successfully measured in situ cross direction neutral wind. WATS detected the wind direction by using moving paddles to block the incoming particle stream from access to a pressure chamber. The wind direction was determined by detecting minima in the chamber pressure in relation to the paddle positions. 1) Mechanical Stability and Reliability: The replacement of two independent stepped paddles in front of the sensor with a single rotating disk integrated behind the aperture significantly improves instrument robustness, stability and reliability. 2) Mechanical Position Tolerance: The previous design suffers from uncertainty in the paddle positions ahead of the aperture, depending on stepper motor step sizes or complicated sensors to verify in operation that the sensors are where they are commanded to be. The rotating sensor, when held at a constant speed over the course of 1 rotation, alleviates this problem, requiring only a single "home position" indicator to guarantee polarity of the signal is known. 3) Component Minimization: Two bi-directional stepper motors were required in the legacy design, replaced by a single, constant speed DC motor.

The low pressure range makes measurement difficult but this is improved by using slots instead of paddles to block and uncover the orifice which is used to measure the pressure. This means the pressure peaks are the critical measurement and not the valleys which are at the lowest pressure and therefore susceptible to noise problems making curve fitting difficult if not impossible. The aperture is rotated under four slots that are equally spaced around the 360 degree path of the aperture. This creates four pressure peaks per revolution. As long as the rotation speed is constant over a single revolution the sensor is self-calibrating. The space between the peaks determine the arrival angle of the neutral particles.

Figure 1B:
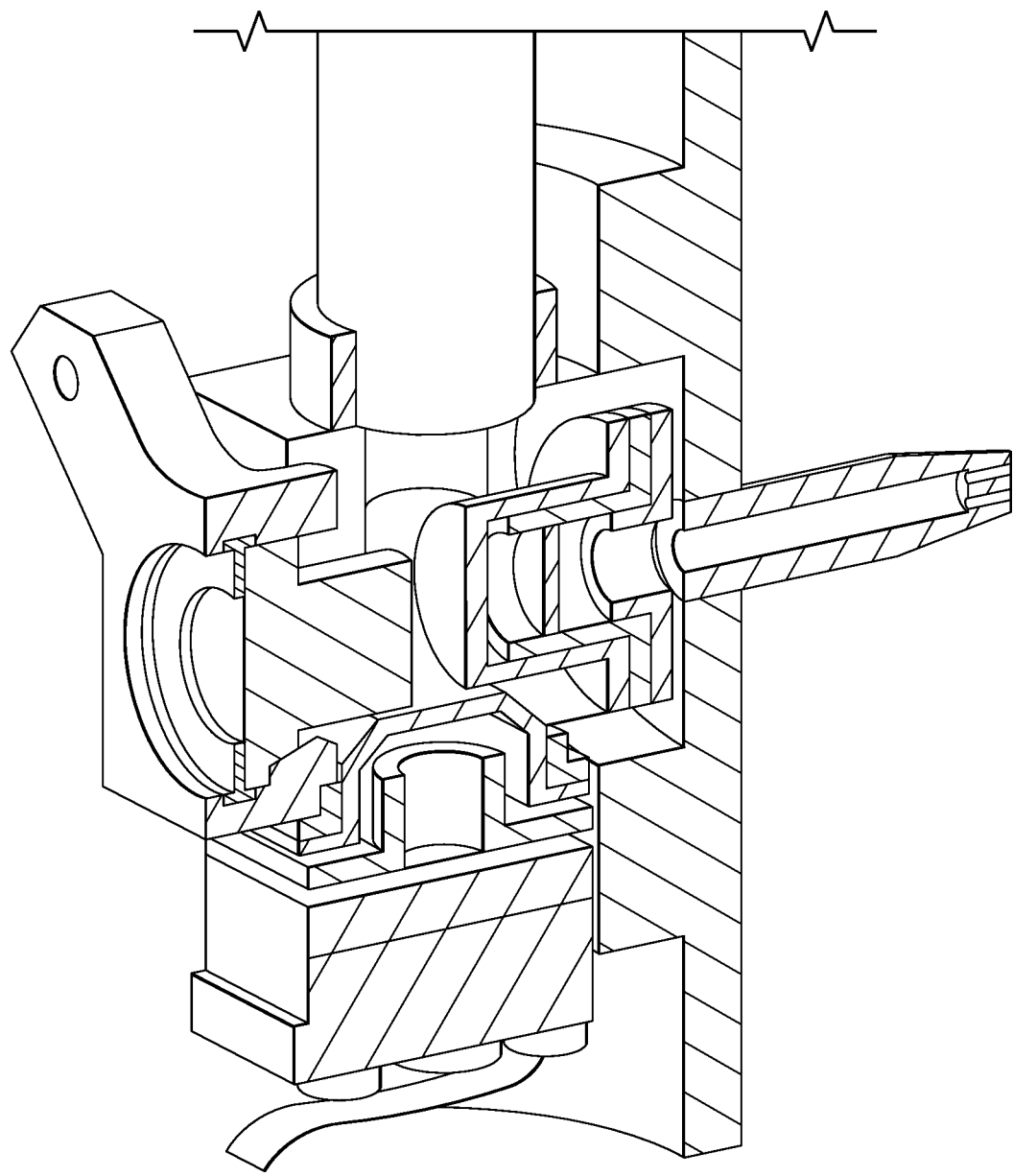
FIG. 1B is a more detailed view of the ion source within the WATS instrument.

Despite the importance of the neutral atmosphere, there are only a few measurements given the difficulty in performing a robust measurement. The last fully successful set of wind measurements was performed by the Winds and Temperature Sensor (WATS) on the Dynamics Explorer-2 mission (1981). This device used a pair of baffles oriented along two directions, one is shown in FIGS. 1A and 1B. The baffles would individually and slowly move across the instrument entrance field of view. When the angle of the baffle with respect to the entrance matched the arrival angle of neutral winds the instrument would record a pressure minimum. The wind velocity along a direction orthogonal to the satellite may be determined using the baffle angle associated with the pressure minimum along with the known motion of the satellite. An instrument with two baffles oriented orthogonally with respect to each other produces a measure of wind speed along two directions orthogonal to the satellite motion.

Figure 2:
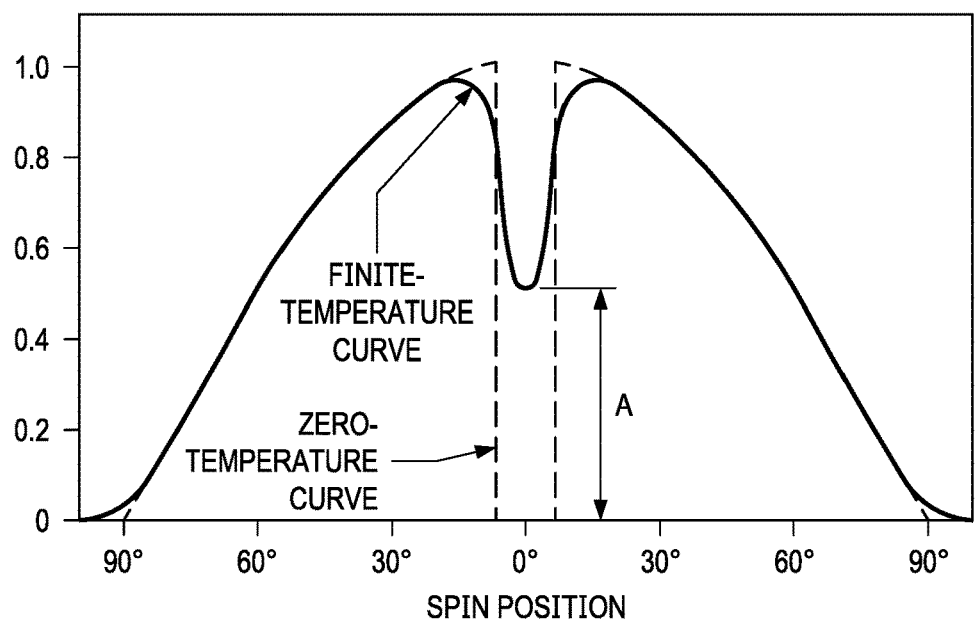
FIG. 2 is an illustration of the difference in area between curves used to determine neutral gas temperatures for WATS.

WATS also produced a temperate measurement by comparing the difference in area between a predicted curve at 0 Kelvin and the actual measured curve, shown in FIG. 2. The level of neutral particles in the instrument was determined using a mass spectrometer which requires setting the instrument to a particular expected input gas mass. Temperatures can only be obtained from a single gas species at a time.

The Communications/Navigation Outage Forecast System (C/NOFS) satellite, launched in 2008, featured a Cross-Track Wind Sensor (CTWS) developed by the University of Texas at Dallas. This instrument had four independent chambers, each with a pressure gauge. The relative pressures between the cavities is determined by the arrival angle of neutral particles. By computing the ratio of measured currents from the pressure gauges the arrival angle may be determined. This instrument requires four extremely well-matched ion gauges which makes the technique extremely difficult to achieve in practice. The CTWS does not produce a measure of temperature.

The Sweeping Aperture Neutral Drifts Sensor (SANDS) is a novel instrument to measure neutral winds along two cross-track directions along with neutral density, composition, as well as temperature. The instrument also reduces the volume, mass, and power compared to previous instruments while increasing sensitivity, accuracy, and reliability. The instrument is small enough to fit within the constraints of a CubeSat platform, an emerging spacecraft class built in units of 10×10×10 cm.

Inspiration for the SANDS neutral wind sensing technique traces back to the last successful in situ neutral wind sensor, which was flown on Dynamics Explorer. The approach here inverts the heritage design, which used dual baffles for local vertical and horizontal measurements. Instead, SANDS uses a single radially offset aperture rotating beneath four slits (anti-baffles), isolating two crosstrack wind directions. A new analysis technique has been developed to support faster operation and the determination of additional parameters.

This set up only requires a single motor (WATS has 2) operating at a single speed with no need to start or stop the motor in operation. WATS' baffles need to change direction every sweep. Further, SANDS only requires a single ion gauge (4 for CTWS), and also eliminates the need for a mass spectrometer (used by WATS) and the magnets they employ. Magnetic fields produced by spacecraft or instrumentation interferes with plasma measurements, limiting the number of potential missions. SANDS is well suited for missions measuring both neutral and plasma dynamics.

The SANDS operation is analogous to the cross-track plasma drift measurement performed by the Ion Velocity Meter [2] in that the location of a beam of gas formed by an entrance aperture is detected by the response of a sensing element. Similar to IVM, the neutral beams produced by the anti-baffles have some angular deflection with respect to the instrument boresight, determined by the neutral drift direction along with the S/C pointing and velocity. For SANDS, the arrival angle of neutral winds changes the time a peak in the output current is observed as the entrance aperture rotates around the instrument.

This disclosed SANDS instrument is an advance in in situ neutral particle sensor technology. The lack of understanding of the interactions between the neutral atmosphere and ionosphere current hampers efforts to predict Earth's daily ionospheric conditions. Though it is established that the neutral atmosphere is a primary F region ionospheric driver, both directly (through collisions) and indirectly (through the production of global electric fields), the upper thermosphere has proved a challenging regime to study due to the short lifetime of spacecraft at these altitudes and difficulties producing instruments capable of operating at the observed density levels. We also present a reference mission that uses a constellation of identically instrumented CubeSats to measure the day-to-day variability of ion/neutral coupling in the F region ionosphere and upper thermosphere between 300-500 km at equatorial latitudes. The reference mission addresses NASA Key Science Goal 2, which seeks to determine the dynamics and coupling of Earth's magnetosphere, ionosphere, and atmosphere and their response to solar and terrestrial inputs.

Unraveling the puzzle of ion/neutral coupling requires a broad range of simultaneous, coincident measurements of ion and neutral densities, composition, temperatures, and motions. The most recent mission to attempt to perform some of these measurements, density and motion, was CINDI (Coupled Ion Neutral Dynamic Investigation), which failed to do so when unexpectedly low neutral densities were encountered. The upcoming Ionospheric Connections (ICON) mission will address some aspects of ion/neutral coupling below 300 km using remote optical observations, however the range of neutral measurements are performed by three optical instruments, a payload too large for a CubeSat. CubeSats are an inexpensive path to orbital instrumentation and are well suited for low altitude missions, like the reference mission. There are no proven individual instruments that can measure all of the required neutral properties between 300-500 km, particularly within the resource envelope of a CubeSat. A suitable instrument may be adapted for both CubeSat and larger spacecraft (s/c).

This new, simple, and robust instrument, the Sweeping Aperture Neutral Drifts Sensor (SANDS), will measure neutral density, [O]/[N2], atmospheric pressure, O and N2 temperatures, and cross-track (horizontal and vertical, perpendicular to the s/c track) winds. To highlight the transformational nature of SANDS, we describe a reference constellation mission of 12 CubeSats that will provide complete local time and latitude coverage of the equatorial ionosphere and thermosphere and allow the calculation of 3D neutral winds. Each satellite in the reference mission constellation will carry a SANDS, an Ion Velocity Meter (IVM), and a Langmuir Probe (LP). Every second, simultaneous measurements of the plasma and neutral densities (O, N2, O+, H+, e−), temperatures, compositions, 3D ion drifts and 2D neutral winds may be made.

The reference mission can produce a complete 3D wind vector without an in-track neutral wind sensor. The formation of the reference constellation produces different SANDS instrument orientations on s/c with overlapping ground tracks, providing two non-parallel, spatially coincident horizontal wind measurements separated in time by 4-48 min. Like ICON, the combination of two separate non-parallel horizontal wind measurements at the same spatial location (but different times) be used to unambiguously form a complete 2D horizontal wind vector. The addition of another instrument to measure ram winds would not decrease the number of required satellites and it significantly increases the cost and requirements of each s/c. The temporal differences in measurement are not an issue when mapping winds every hour in local time.

Figure 3:
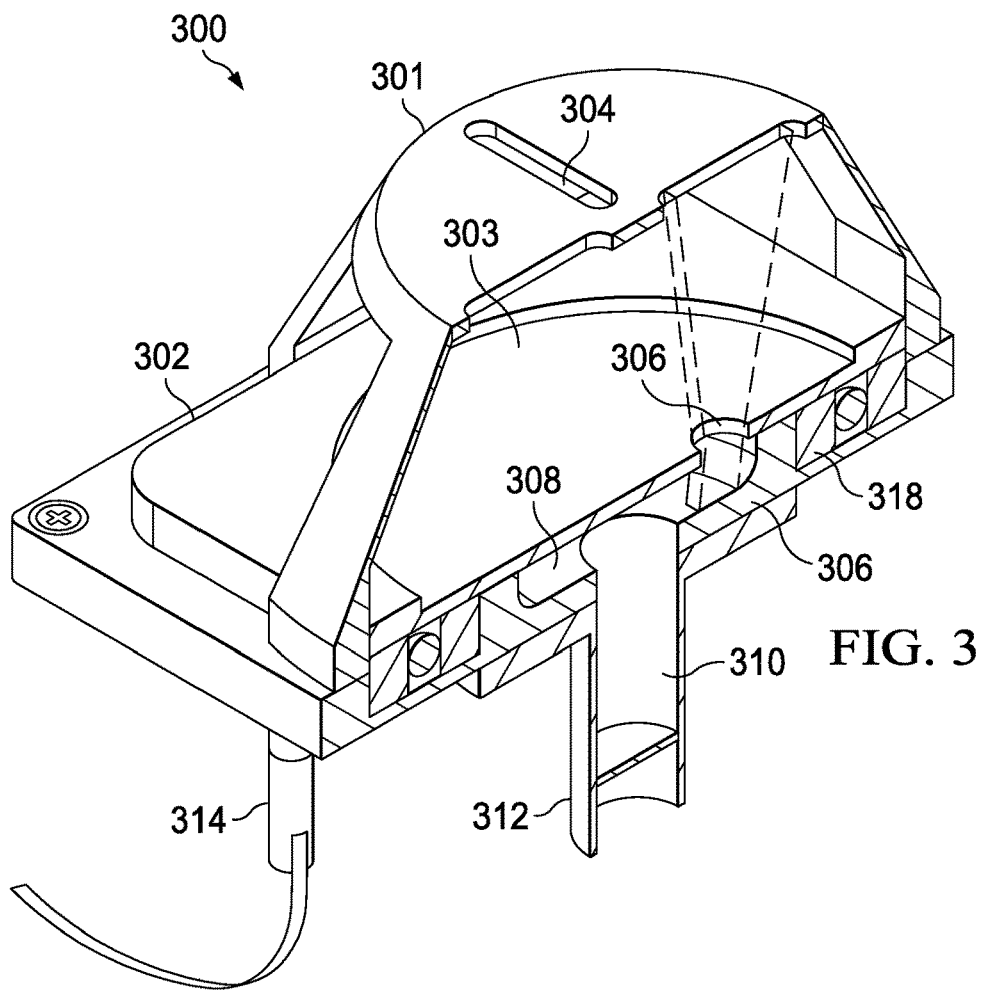
FIG. 3 is a diagram of a cross section of a SANDS instrument according to an illustrative embodiment.

Turning now to FIG. 3, a diagram of a cross section of a SANDS instrument is depicted according to an illustrative embodiment. SANDS instrument 300 is an example of a scientific instrument for measuring neutral atmospheric conditions at satellite altitudes. SANDS instrument 300 includes an ion gauge 312 configured to measure ion pressure. Ion gauge 312 includes an outer chamber 308 and an inner chamber 310. Outer chamber 308 is covered by an aperture plate 303. SANDS instrument 300 also includes a lid 301 covering the aperture plate 303 and the ion gauge 312. The lid 301 includes a plurality of slits 304 (also referred to as slots or slot anti-paddles). In an illustrative embodiment, the lid 301 includes four slits 304 or slot anti-paddles. Aperture plate 303 includes an aperture opening 306 (i.e., spinning aperture). The aperture plate 303 is configured to rotate such that each of the slits 304 are periodically exposed by the aperture opening 306 to allow a neutral beam flux to enter the outer 308 and inner chamber 310 the ion gauge 312. SANDS instrument 300 includes a direct current (DC) brushless motor/gearbox 314 coupled to the aperture plate 303 and configured to rotate the aperture plate 303. DC brushless motor/gearbox 314 may be coupled to a data processing system which may control a speed at which the DC brushless motor/gearbox 314 rotates the aperture plate 303. SANDS instrument 300 may also include a gear cover 302 covering the DC brushless motor/gearbox 314.

Figure 10:
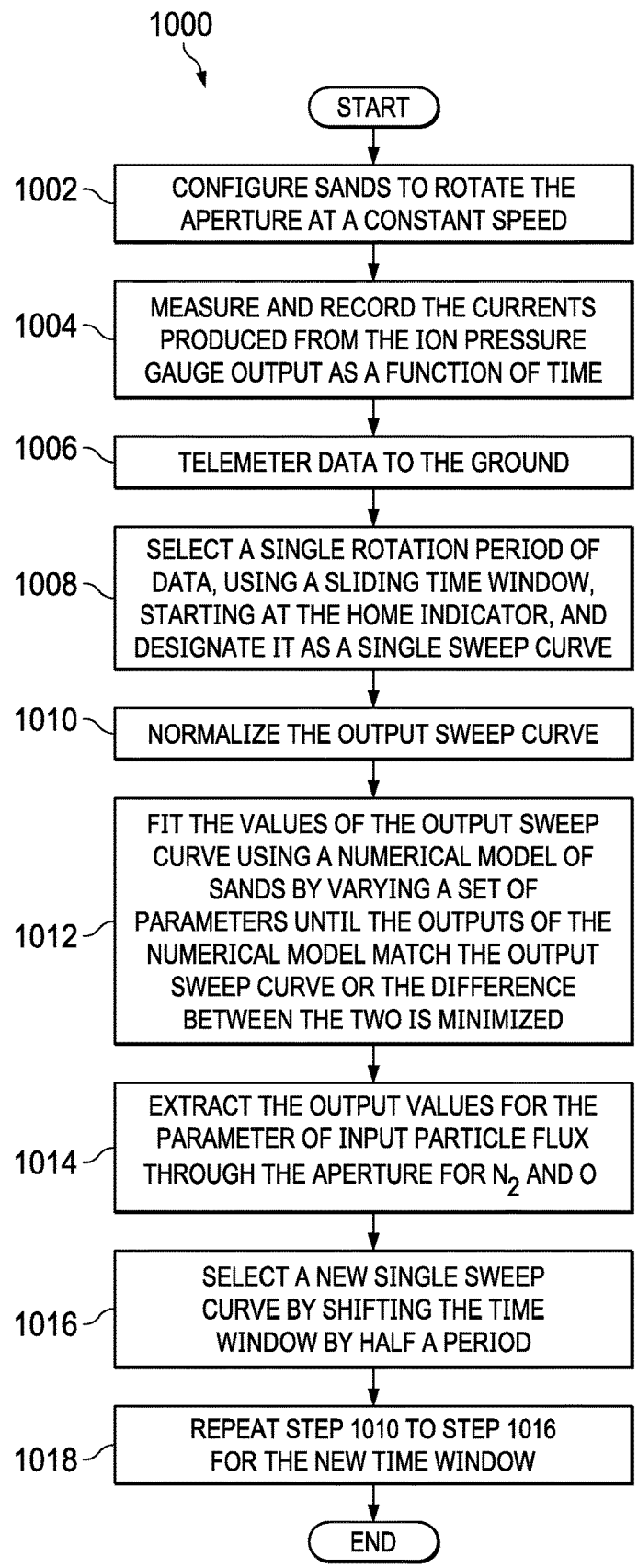
FIG. 10 is a flowchart of a method to neutral atmospheric conditions, such as ion pressure, at satellite altitudes depicted in accordance with an illustrative embodiment.

In an illustrative embodiment, SANDS instrument 300 also includes a data processing system, such as data processing system 1000 shown in FIG. 10, coupled to the ion gauge 312, wherein the data processing system is configured to obtain pressure measurements from the ion gauge 312 and determine cross-track winds using peaks in the pressure measurements in time. In an illustrative embodiment, wind arrival angles are obtained according to absolute time locations of the peaks pressure measurements. In an illustrative embodiment, wind arrival angles are obtained according to a time difference between locations of the peaks of the pressure measurements. In an illustrative embodiment, wind arrival angles are obtained according to a time difference in peak locations of the pressure measurements. In an illustrative embodiment, the data processing system is configured to determine when winds are normal to SANDS instrument 300. In an illustrative embodiment, the aperture plate 303 is located between the lid covering 301 and the ion gauge 312. In an illustrative embodiment, a rotation rate of the aperture plate 303 is increased or decreased according to at least one of mission requirements and expected signal levels.

Figure 4A:
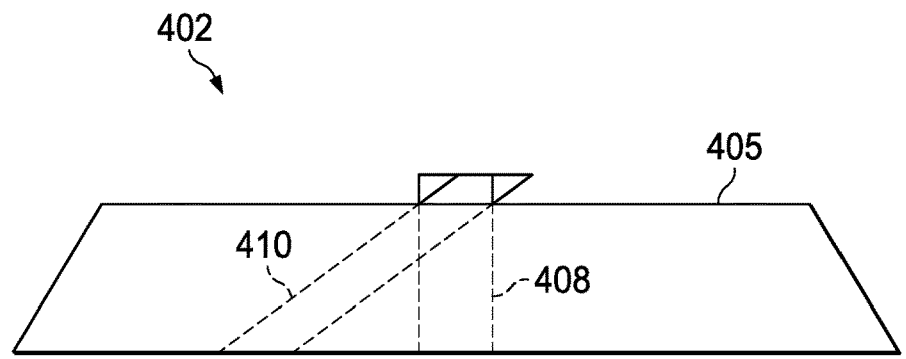
FIG. 4A is a side view illustration of location of neutral wind beams and intersection with SANDS rotating aperture for a normally incident wind and one from right to left in accordance with an illustrative embodiment.
Figure 4B:
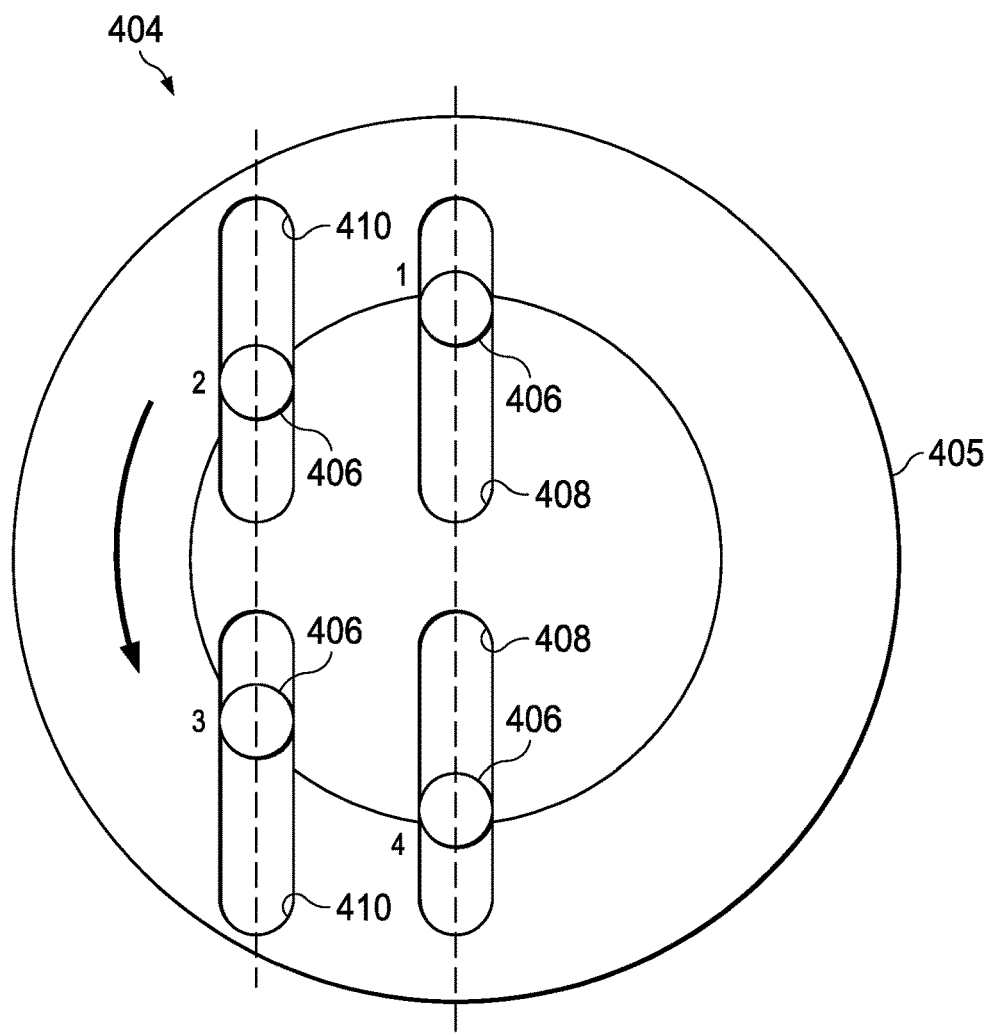
FIG. 4B is a top view illustration of location of neutral wind beams and intersection with SANDS rotating aperture for a normally incident wind and one from right to left in accordance with an illustrative embodiment.

FIGS. 4A and 4B illustrate the location of neutral wind beams and intersection with SANDS rotating aperture for a normally incident wind and one from right to left in accordance with an illustrative embodiment. FIG. 4A shows a side view 402, and FIG. 4B shows a top view 404 of an aperture plate 405 illustrating the intersection of a SANDS rotating aperture 406 for a normally incident wind 408 and one from right to left 410.

Boxes 408 indicate the position of the neutral beams projected onto the aperture plane along with the rotating aperture 406 intersections (circle within) for a normally incident wind. Boxes 410 demonstrate the same quantities for a wind moving from right to left. Winds are determined by tracking the time difference between the pressure peaks produced by opposite slots as the aperture 406 rotates. Note only two slots are shown for clarity. The normally incident wind has a pressure peak time difference of half an aperture rotation period while the other wind (right to left) has less than a half period time difference (points 2 to 3) followed by more than a half period (points 3 to 2). This technique features an automatic calibration for a zero-cross track wind as a normally incident beam has a constant half period time difference. Neither WATS nor the CTWS features this intrinsic zero-wind calibration on-orbit.

The absolute location of the pressure peaks in time may also be used to determine the arrival angle of winds. However, this technique requires a precise calculation/determination of the amount of time it takes for a pressure peak to be observed by the pressure gauge after a peak in neutral flux is present at the entrance aperture. This time difference is driven by the diffusion time for particles in the outer chamber to reach the pressure gauge chamber. This diffusion time depends upon the volumes of the respective chambers as well as the chamber temperatures.

While previous instruments, such as WATS, fit measurements to an analytical equation describing the instrument, WATS was operated in equilibrium. The time scale of each baffle setting was long compared to the pressure rise and fall time of the instrument chambers. In contrast, SANDS' aperture is continually rotating with associated changes to the input gas flux at time scales faster than equilibrium can be reached, thus an alternative technique is required to account for the time-history of instrument inputs.

To more completely support non-equilibrium operation as well as the extraction of temperature and composition information, the curves produced by SANDS are fit to signals produced by a numerical model of the instrument operation. The number density of particles within SANDS as a function of time as the aperture rotates, in both the ion gauge and the preceding chamber, are obtained by direct numerical integration of coupled partial differential equations (PDEs), $$\frac{dN_{oc}}{dt} V_{oc} = \frac{Fo(t)}{2} + \frac{V_T}{4}(-N_{oc}A_{ap} - N_{oc}A_{ig} + N_{ig}A_{ig}) + C\frac{V_T(\text{Background})}{8}N_O A_{ap} \quad \text{Eq. (1)}$$

$$\frac{dN_{ig}}{dt} V_{ig} = \frac{V_T}{4}(N_{oc}A_{ig} - N_{ig}A_{ig}) \quad \text{Eq. (2)}$$

$$\frac{dN_{oc}}{dt} V_{oc} = F_{N2}(t) + \frac{V_T}{4}(-N_{oc}A_{ap} - N_{oc}A_{ig} + N_{ig}A_{ig}) + C\frac{V_T(\text{Background})}{4}N_{N2} A_{ap} \quad \text{Eq. (3)}$$

$$\frac{dN_{ig}}{dt} V_{ig} = \frac{V_T}{4}(N_{oc}A_{ig} - N_{ig}A_{ig}) \quad \text{Eq. (4)}$$

where oc refers to the outer-chamber, ig refers to the ionization gauge pressure chamber, and ap refers to the aperture. For each opening, N is particle density, V is volume, and A is area. VT is thermal velocity within the instrument (VTN/4 is standard thermal molecular flux through unit surface area) and F is the input particle flux through the aperture (with subscripts denoting species, O for neutral Oxygen, N2 for molecular Nitrogen). F varies with time and is obtained by integrating the calculated neutral beam flux over the aperture area as it rotates. Particles that pass through the aperture enter the outer-chamber where interactions reduce the gas temperature to that of the system walls and inter-particle and surface interactions will combine O into O2 [2]. Particles thermally diffuse between the outer chamber, the ion gauge, or out of the instrument. A pair of equations is required for each gas species to be measured. The total density is obtained by adding the individual gas densities.

The final terms in equation 1 and 3 account for the flux of background neutral particles not associated with the beams formed by the anti-baffles. This term has been shown to produce pressures in the instrument a factor of more than 20 times lower than the peak pressures produced by the beams. The appropriate atmospheric (background) temperature for this term may be obtained from the SANDS geophysical outputs from the previous sweep. Background temperatures vary slowly over an orbit thus this term is generally constant. Variations in density are removed by normalizing the output currents based upon the peak signal per sweep. Thus, this background term has little effect on the derived geophysical outputs given the constant and low signal levels over a sweep.

The constant C allows for a fixed increase/decrease in this particle flow based upon the design of the SANDS baffle which generally restricts particle access to the aperture. This constant may be obtained as part of normal operation as pressure minima (no neutral beam forcing) is routinely achieved as part of a nominal sweep. Alternately, rotating the SANDS aperture slower than normal while on-orbit ensures the instrument will reach an equilibrium pressure minimum when not excited by a gas beam from one of the slots. Outgassing within the instrument can also produce a background output signal. This signal is not expected to vary over timescales longer than a sweep thus it may be treated within the fitting process as a constant. Lab experiments have also demonstrated that background pressure levels fall quickly after the instrument is placed in vacuum. Given the expected low levels and constant level over a sweep outgassing pressures are expected to have little effect on the extraction of geophysical parameters.

Figure 5:
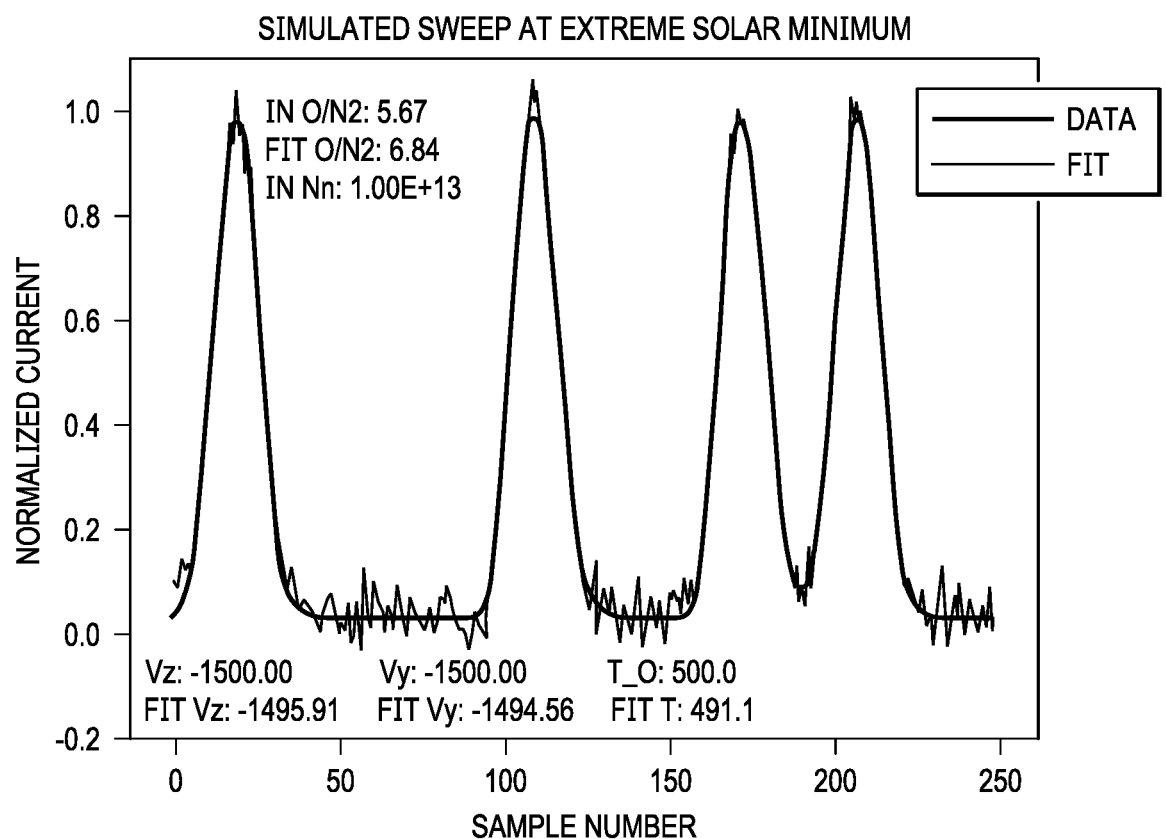
FIG. 5 is a graph illustrating an example sweep at minimum density expected for extreme solar minimum at 400 km.

Determination of the temperature and composition is shown explicitly in FIG. 5 as part of the curve fitting process (using equations 1-4).

The self-calibration is available when using the curve fitting or time difference methods. A normally incident wind has a time difference of half a period. This feature comes about naturally based on the mechanical design and analysis technique.

SANDS measurements may also be used to determine the ambient gas pressure and number density. The gas pressure within the inner chamber is directly measured by the pressure gauge. The temperature of this chamber is also monitored, thus the particle density within the chamber may be determined using the ideal gas law, P=NkT (N is number density, k is Boltzmann's constant, and T is temperature).

At equilibrium, the internal particle density is related to the ambient particle density such that the flow of particles out of the instrument is matched by the flow of particles into the instrument. This relationship, at equilibrium, is obtained by setting the left hand terms of equations 1-4 to zero. For non-equilibrium operation the external particle density may be obtained by fitting observed curves to equations 1-4 without normalizing the output currents from the instrument and including the external particle density as a variable within the curve fitting method (included within the Fo and Fn2 terms). The ambient pressure is determined by using the extracted external number densities along with the extracted gas temperature and P=NkT.

An example sweep from SANDS is shown in FIG. 5. The SANDS output is determined assuming a Maxwellian distribution for each neutral particle species and calculating the neutral beam flux at the aperture plate as a function of position. As the aperture intersects these beams the total flux determined by this intersection is input into the SANDS PDE description to generate internal particle densities over time. The particle number density and assumed wall temperature (0 C for model outputs) are used to calculate the pressure within the gauge which is converted to an output current using published gauge transfer functions. The current levels are measured by a simulation of a ranging electrometer to be used in the upcoming SORTIE CubeSat IVM ensuring a robust simulation of gauge current measurements. SANDS also includes a temperature sensor on the chamber walls so that the conversion from particle density to pressure and vice-versa may be specified accurately on-orbit.

Typically, SANDS will sample and record the pressure gauge output current as the aperture plate rotates at a constant speed (2 s period) measuring 128 samples/s, resulting in neutral every half sweep (1 s). A simulated sweep and fit over ~1 rotation is shown in FIG. 5, and includes instrument noise (10 pA) and rotation speed variance (1%). The peak locations are used to derive the wind while the shape of the curves is determined by temperature and composition of the input beam. An aperture plate "home indicator" establishes signal polarity and rotation time. The configured rotation rate may be increased or decreased, depending upon mission requirements and expected signal levels.

Figure 6:
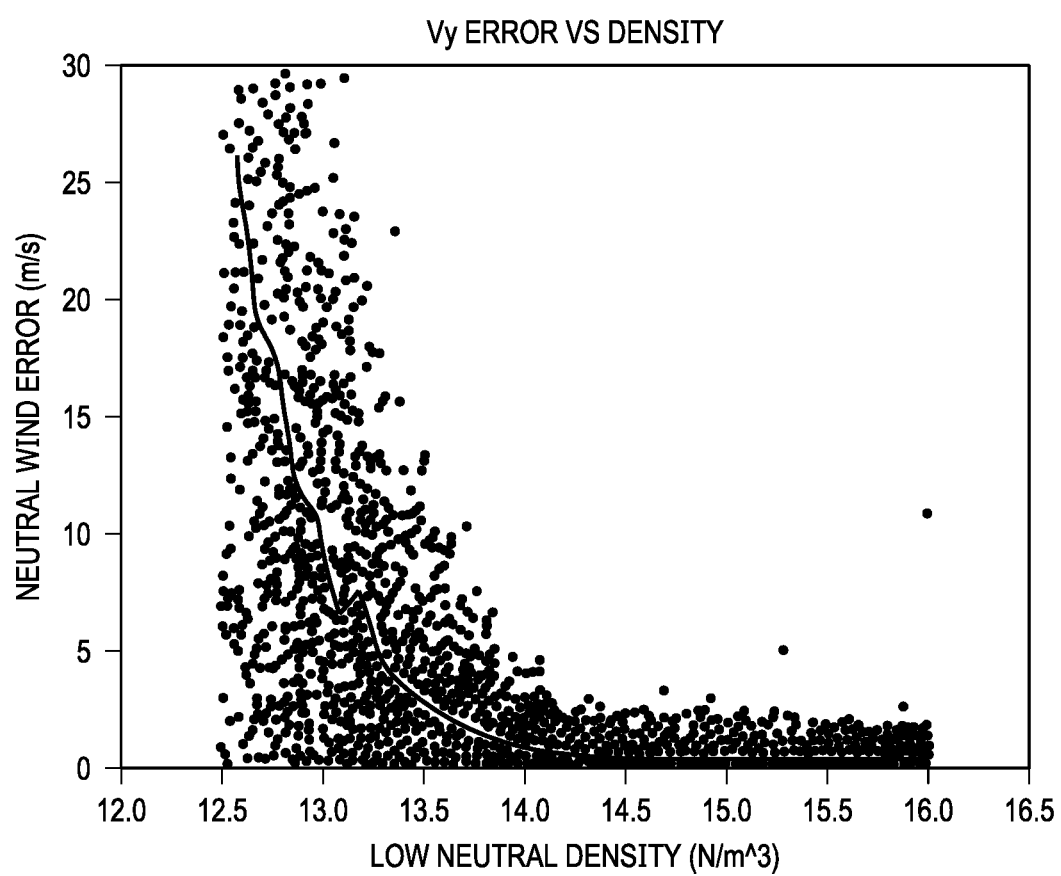
FIG. 6 is a scatter plot of wind error and median as a function of neutral winds.
Figure 7:
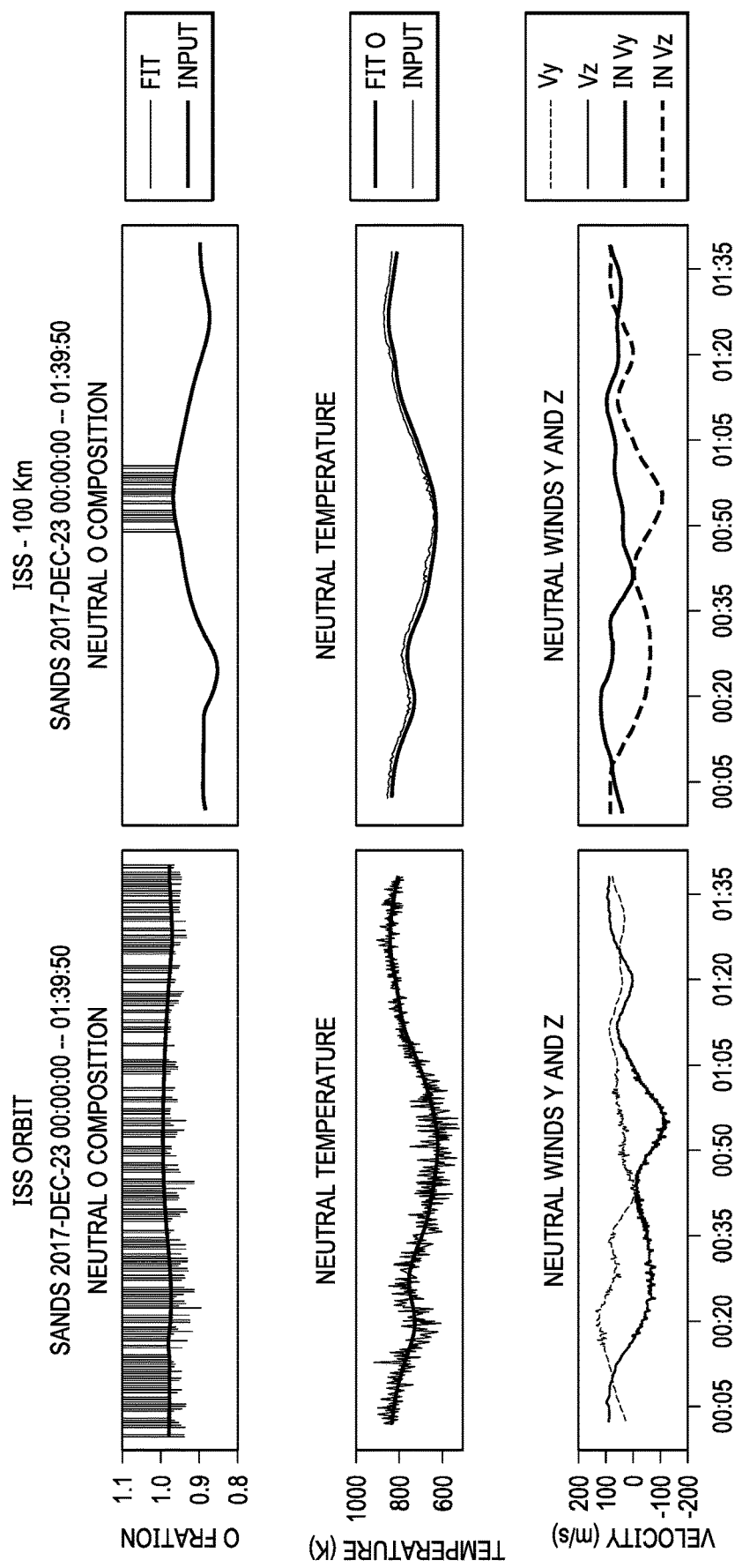
FIG. 7 shows simulated orbit through a MSIS-E-90 (Mass Spectrometer Incoherent Scatter) neutral atmosphere, with neutral winds specified by the Horizontal Wind Model (HWM14) illustrates geophysical wind range Left: ISS orbit 420 km. Right: ISS.

A statistical characterization of the SANDS output performance for determination of the cross-track wind is shown in FIG. 6 with the median error shown in red. A representative orbit for SANDS, using an International Space Station (ISS) orbit, is shown in FIG. 7, along with one 100 km lower in altitude. As CubeSats will be dispensed below ISS, the ISS orbit shown (420 km altitude) demonstrates instrument margin. Extreme solar minimum densities (January, 2009) from MSIS are above $1E13$ N/m$^3$ and within SANDS' range.

The gauge output normalization routine used for curve fitting obtains the normalization using smoothing, a process that improves wind determination at low density but introduces a temperature bias at high density. This smoothing also produces an error in composition determination when a single species (>95%) dominates. As can be seen in the right of FIG. 7, areas with composition error correspond with a reduction in the temperature bias. A single species thermosphere produces a signal that is less constrained for composition values near and above 1 and the Levenberg-Marquardt non-linear least squares software uses this relative freedom to remove the temperature bias introduced by the normalization process. Additional software development is planned to reduce the smoothing employed as a function of instrument output current, gradually phasing out the process as peak signal to noise ratios improve. We emphasize these issues are software driven and not intrinsic to instrument performance.

Figure 8A:
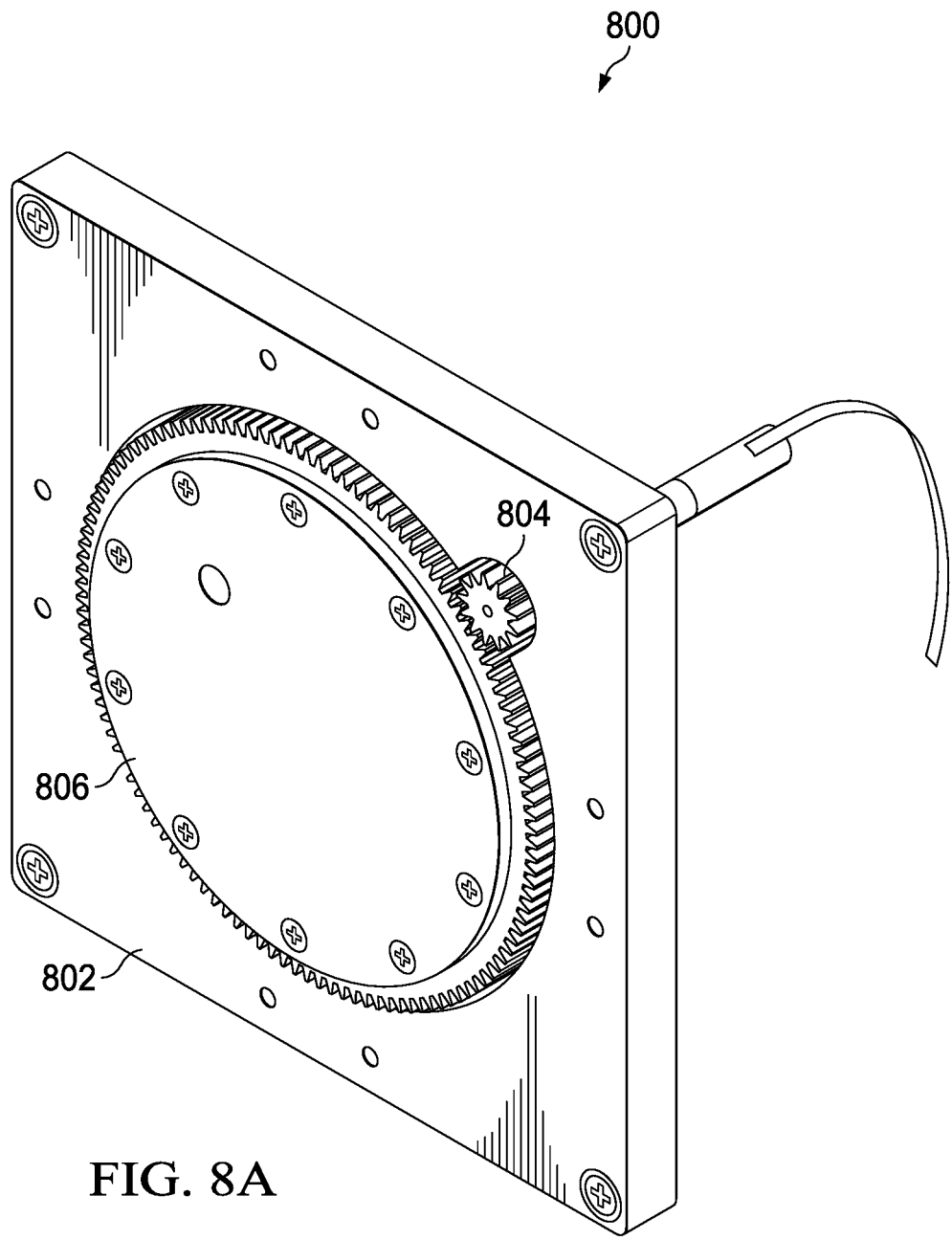
FIG. 8A depicts a top perspective view of a prototype instrument in accordance with an illustrative embodiment.
Figure 8B:
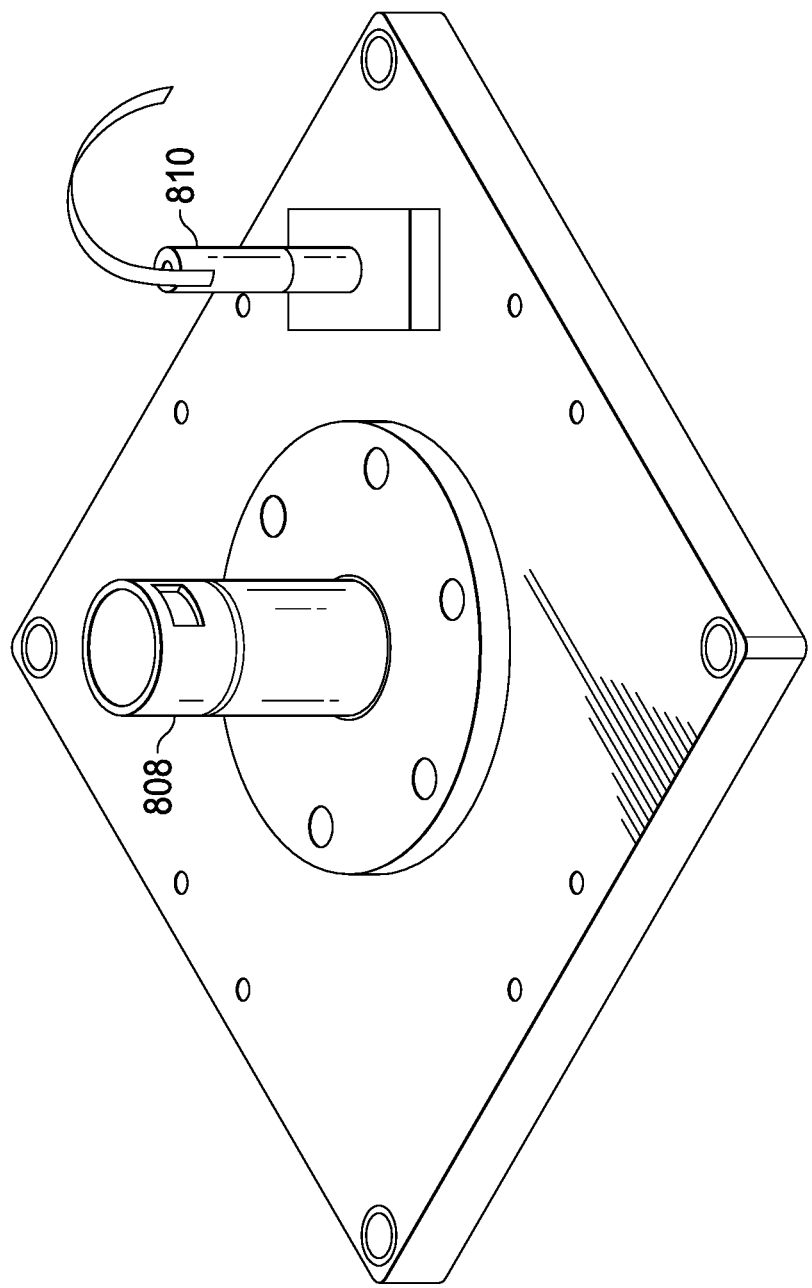
FIG. 8B depicts a bottom perspective view of a prototype instrument in accordance with an illustrative embodiment.
Figure 8C:
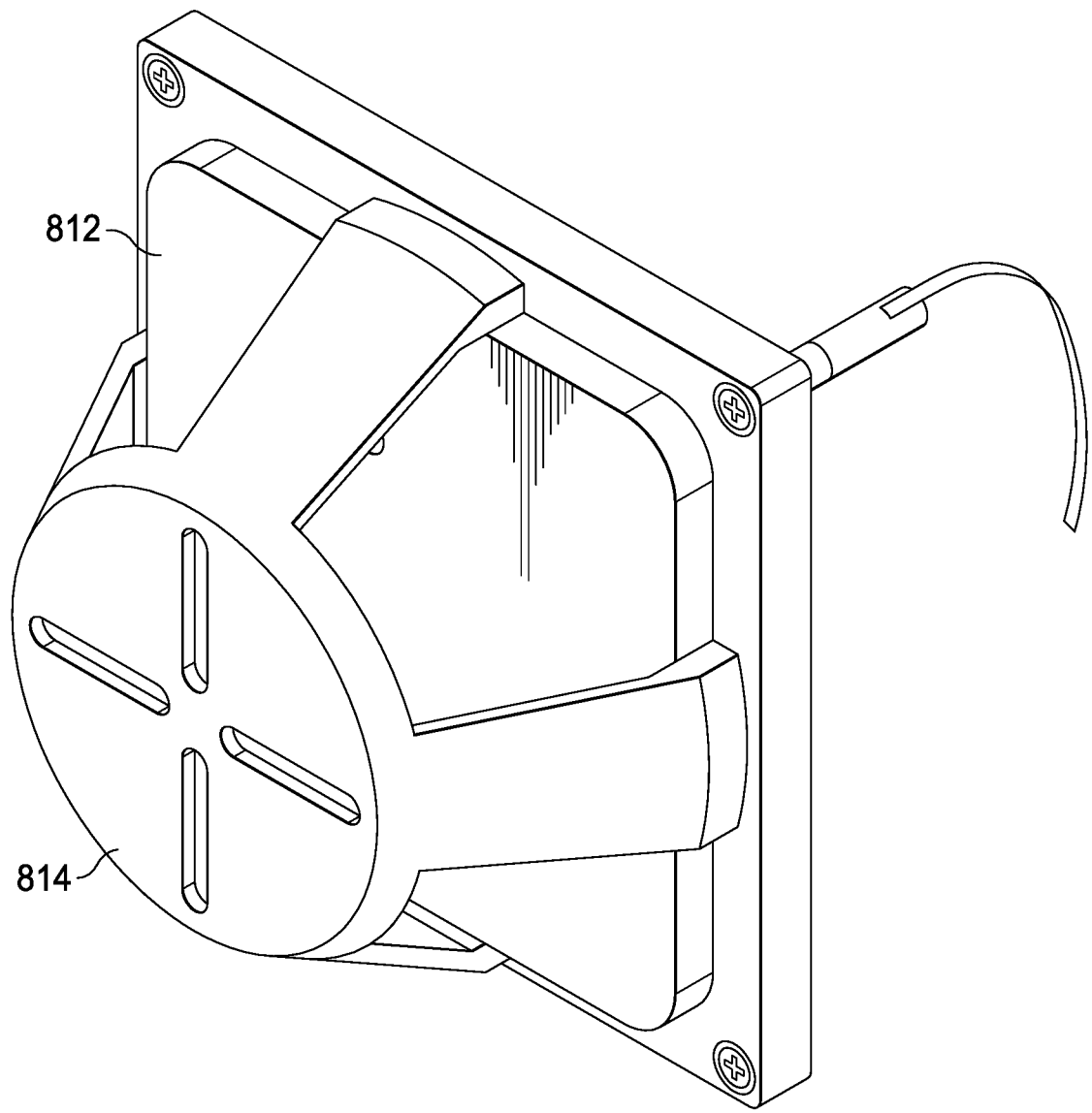
FIG. 8C depicts a top perspective view of a prototype instrument with a gear cover and outer aperture connected in accordance with an illustrative embodiment.

FIGS. 8A-8C depict a prototype instrument in accordance with an illustrative embodiment. SANDS assembly 800 comprises sensor base 802. Spur gear 804 turns apertures plate and gear assembly 806 within the sensor plate 802. FIG. 8B depicts pressure gauge 808 and brushless DC motor 810 that drives spur gear 804. In FIG. 8C shows the gear cover 812 and outer aperture 814 placed over the sensor base 802.

The principles underlying SANDS' construction were verified by manually rotating the aperture entrance across a pressurized gas tube. As the aperture intersected the tube opening gas was injected into SANDS. As the aperture rotated away from the tube the gas within SANDS naturally diffused out of the instrument. The peaks produced by this rotation are clearly visible. The shape of the curves are not expected to match simulations as the gas injected by the pressurized gas tube does not fully recreate the beam characteristics that would be experienced on orbit.

Figure 9:
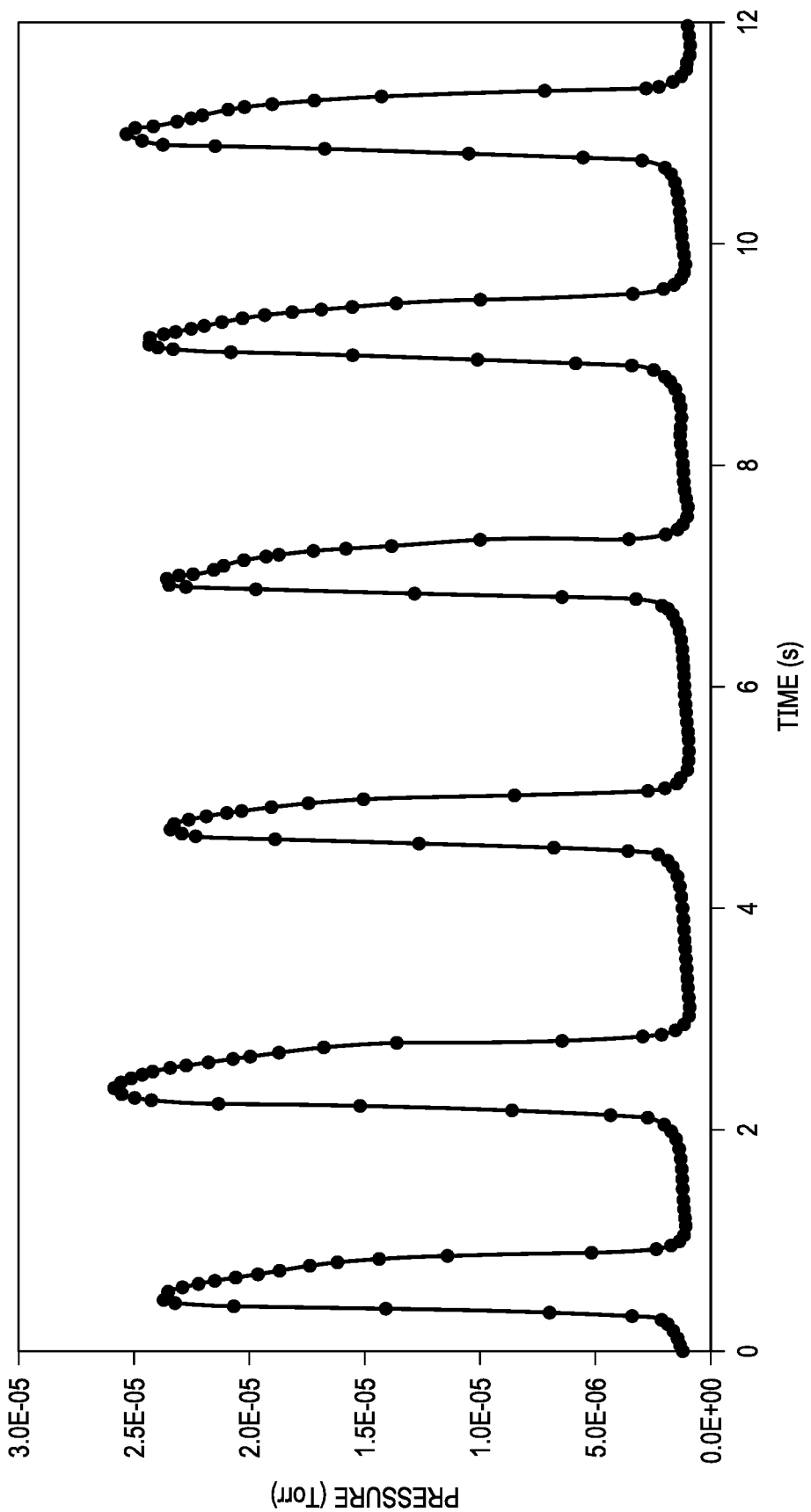
FIG. 9 shows an example of a SANDS pressure pulse response.

FIG. 9 shows an example of a SANDS pressure pulse response in accordance with an illustrative embodiment.

Turning now to FIG. 10, a flowchart of a method to neutral atmospheric conditions, such as ion pressure, at satellite altitudes in accordance with an illustrative embodiment. Process 1000 includes configuring SANDS to rotate the aperture at a constant speed (step 1002). Next, measure and record the currents produced from the ion pressure gauge output as a function of time (step 1004). Next, telemeter data to the ground (step 1006). Next, select a single rotation period of data, using a sliding time window, starting at the home indicator, and designate it as a single sweep curve (step 1008). Next normalize the output sweep curve (step 1010). Fit the values of the output sweep curve using a numerical model of SANDS by varying a set of parameters F([O]), F([N2]), N[O], N[N2], T[N2], T[O], Vy, and Vz until the outputs of the numerical model match the output sweep curve or minimizes the difference between the two (step 1012). Extract the output values for the parameters F[O], F[N2], etc. when the parameters provide a best fit (step 1014).

Select a new single sweep curve by shifting the time window by half a period (step 1016), then repeat steps 1010-1016 for the new window (step 1018). Process 1000 then ends.

Figure 11:
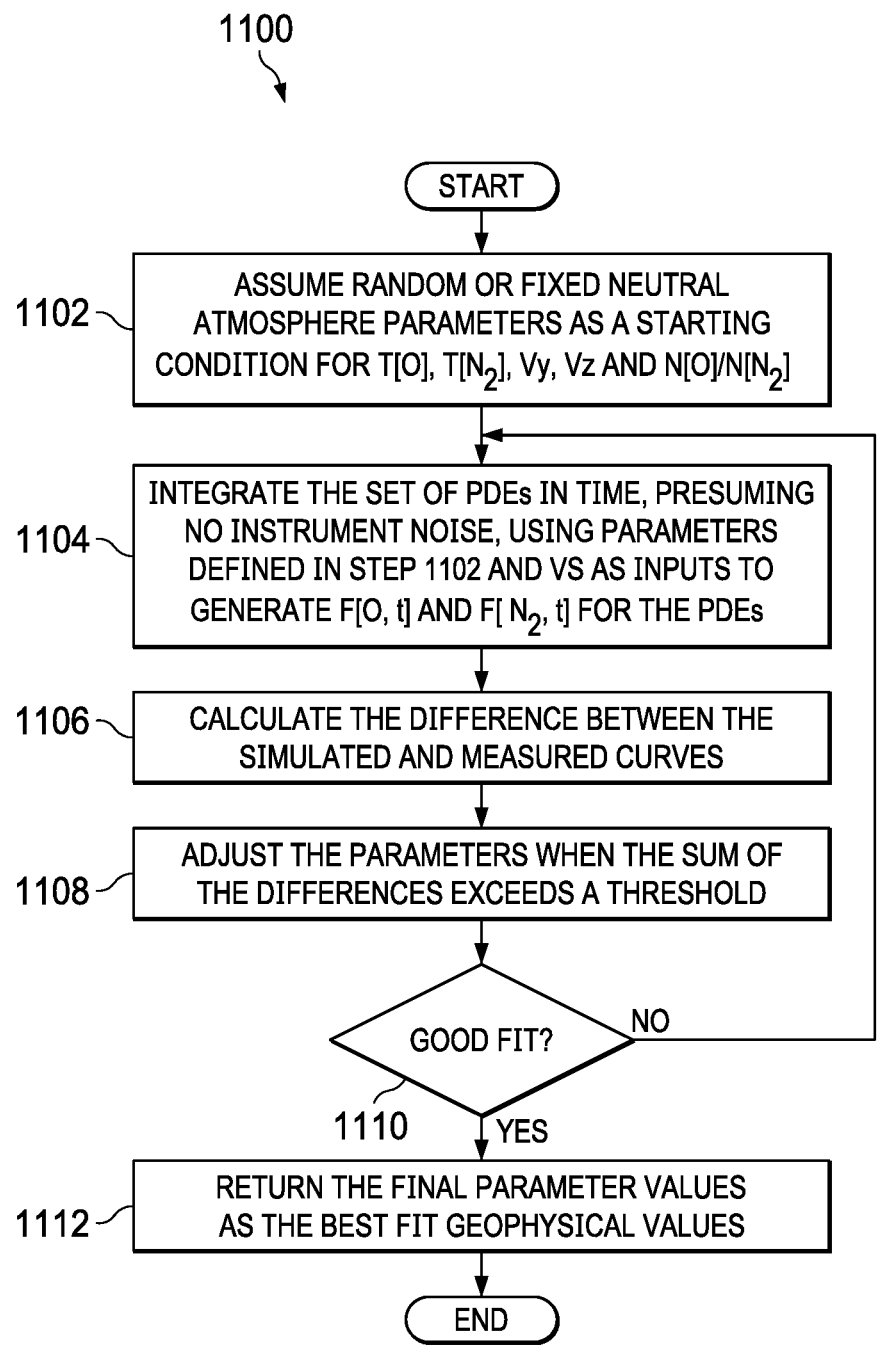
FIG. 11 is a flowchart of a method for fitting the output sweep curve depicted in accordance with an illustrative embodiment.

Turning now to FIG. 11, a flowchart of a method for fitting the output sweep curve is depicted in accordance with an illustrative embodiment. Process 1100 includes assuming random or fixed neutral atmosphere parameters as a starting condition for T[O], T[N2], Vy, Vz, and N[O]/N[N2] (step 1102). Next, the set of PDEs are integrated in time, presuming no instrument noise, using T[O], T[N2], Vy, Vz, N[O]/N[N2], and Vs, the spacecraft velocity as inputs, using parameters as inputs to generate F[O, t] and F[N2, t] for the PDEs (step 1104). If a measure of the along-track wind is available, use Vs+Valong instead of Vs, where Valong is the velocity of the neutral gas perpendicular to the rotating aperture plane. Valong is relative to co-rotation, which is the inertial velocity, relative to Earth center of mass, required to maintain a fixed position above the ground as the Earth rotates. Performing numerical integration in time may be handled by commonly available methods, such as odeint in the open source scipy.integrate Python module.

Next, calculate the difference between the simulated and measured curves (step 1106). The parameters are adjusted if the sum of the differences exceeds a threshold (step 1108) Parameter adjustment typically handled by generalized curve fitting algorithms that automates the process, such as the Levenberg-Marquardt non-linear least squares fitting algorithm.

After the adjustment, a determination is made if the fit is good (step 1110). Determination of good fit may be performed by commonly available methods, such as Levenberg-Marquardt implementation in the open source Scipy Python module, or any function that measures whether data points are within the expected measurement uncertainty.

If the fit is not good, process 1100 returns to step 1104. If fit is good, return the final parameter values as the best fit geophysical values (step 1112). Process 1100 then ends.

Figure 12:
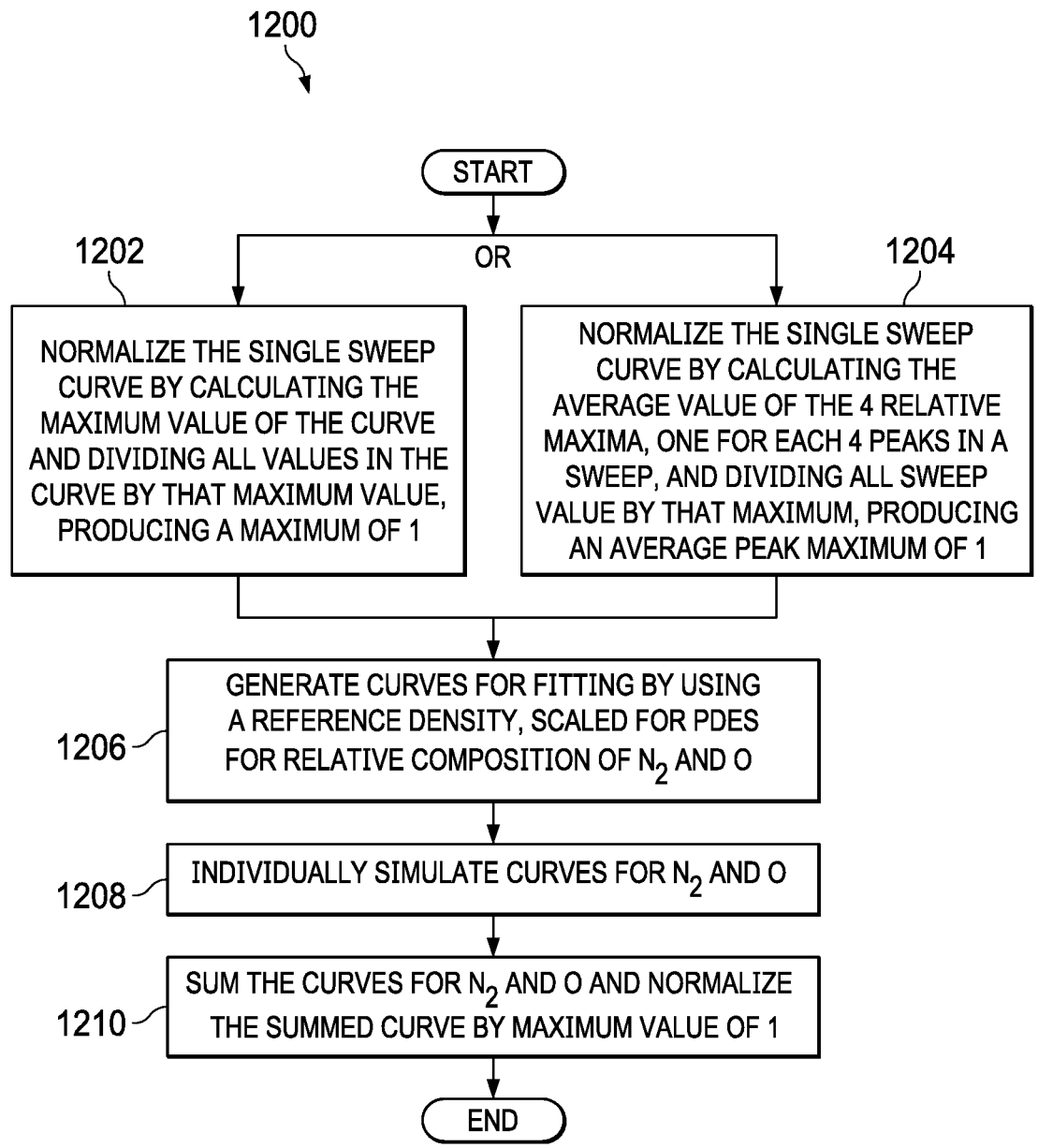
FIG. 12 is a flowchart of a method of a normalization process depicted in accordance with an illustrative embodiment.

Turning now to FIG. 12, a flowchart of a method of a normalization process is depicted in accordance with an illustrative embodiment. The method 1200 to normalize the output sweep curve begins at step 1202 or step 1204. The single sweep curve may be normalized by calculating the maximum value of the curve and dividing all values in the curve by that maximum, producing a maximum of 1 (step 1202).

Alternatively, the single sweep curve may be normalized by calculating the average value of the 4 relative maxima, one for each of the 4 peaks in a sweep, and dividing all sweep values by that maximum, producing an average peak maximum of 1 (step 1204).

Curves for fitting are generated by using a reference density, scaled for PDEs for N2 and O relative composition (step 1206). Curves for N2 and O are simulated individually (step 1208). The curves are summed, then normalized by maximum value to 1 (step 1210). Process 1200 then ends.

Figure 13:
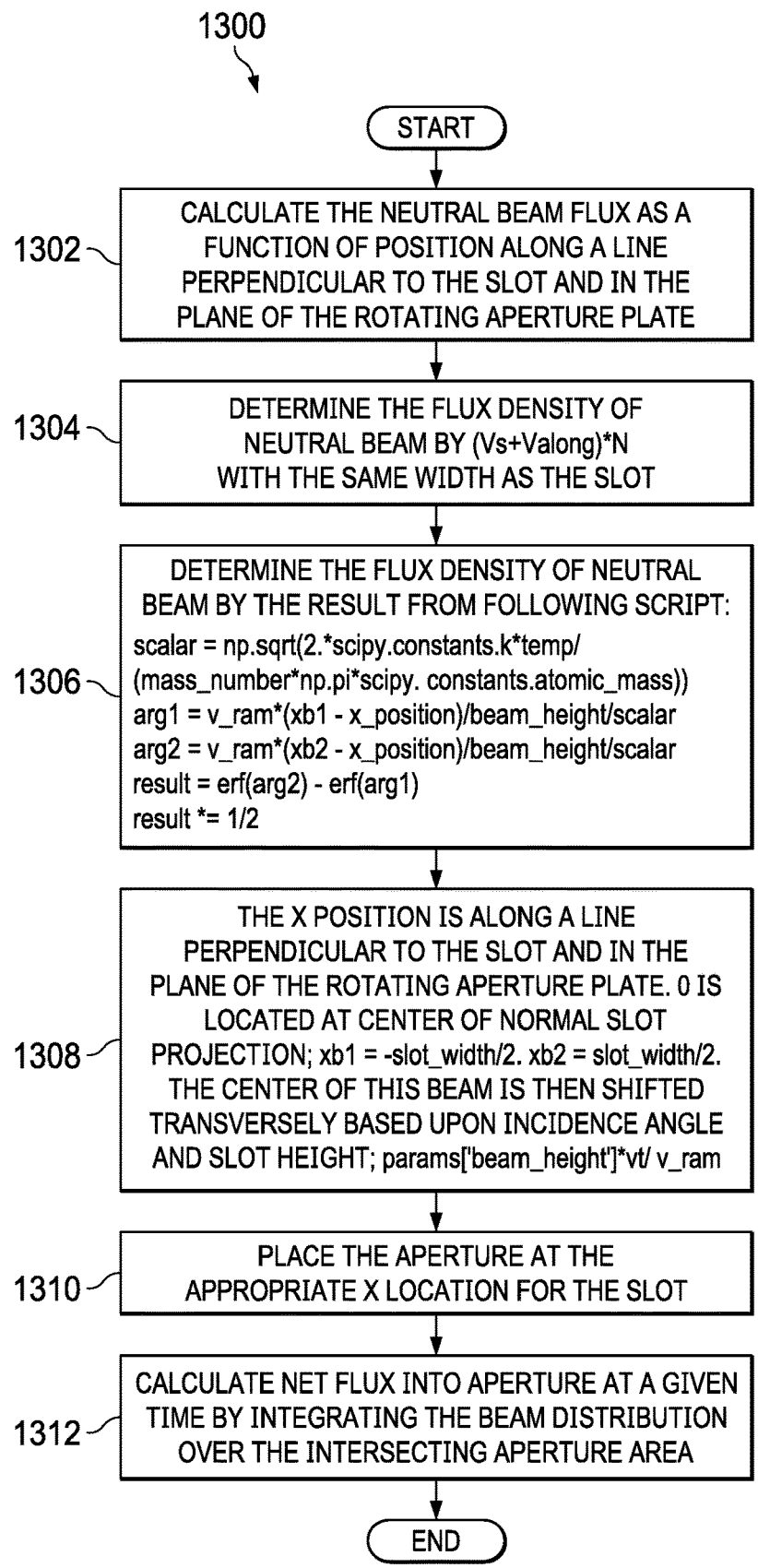
FIG. 13 is a flowchart of a method for determining the flux into the aperture depicted in accordance with an illustrative embodiment.

Turning now to FIG. 13, a flowchart of a method for determining the flux into the aperture is depicted in accordance with an illustrative embodiment. Process 1300 begins by calculating the neutral beam flux as a function of position along a line perpendicular to the slot and in the plane of the rotating aperture plate (step 1302).

The neutral beam flux density is determined by (Vs+Valong)*N with the same width as the slot (step 1304). The mean position of this beam on the aperture plate relative to its normal projection is given by the relevant incidence angle and the distance between slot and aperture plate.

Beam flux density is determined by:
scalar for normal velocity distribution in 1D scalar=np.sqrt (2.*scipy.constants.k*temp/
(mass_number*np.pi*scipy.constants.atomic_mass))
arg1=v_ram*(xb1-x_position)/beam_height/scalar
arg2=v_ram*(xb2-x_position)/beam_height/scalar
result=erf(arg2)-erf(arg1) result*=1/2.
(step 1306)

The x position is along a line perpendicular to the slot and in the plane of the rotating aperture plate. 0 is located at center of normal slot projection; v_ram=Vs+Valong, the net velocity into the instrument, perpendicular to the rotating aperture plane; Beam_height is the height of the fixed cover (with the slots) above the aperture plane; xb1=−slot_width/2. Xb2=slot_width/2. The center of this beam is then shifted transversely based upon incidence angle and slot height; params['beam_height']*vt/v_ram, where v_t is the net transverse velocity along the plane of rotating aperture plane and also the velocity perpendicular to the slot pairs (step 1308).

The net flux into aperture at a given time is calculated by placing the aperture at the appropriate x location for the appropriate slot (step 1310) and integrating the beam distribution over the intersecting aperture area (step 1312). Process 1300 then ends.

Measurements by more than one SANDS instrument on different spacecraft in a given spatial region with some allowed time difference may be combined to produce a more complete wind vector provided the instruments don't measure winds along the same directions. A single SANDS will typically provide a vertical measurement and horizontal measurement. This horizontal wind isn't the full horizontal wind, only the portion along the measurement direction. Two horizontal SANDS wind measurements along different horizontal wind directions (ideally separated by 90 degrees) may be used to solve for the actual wind vector. In the 90 degree case, the full wind vector is the simple vector sum of the two measurements. The simplest expression of the general solution chooses one of the measurements, V1=Vx x, to be along unit vector x. The second vector, V2, may then be written as being pointed partially along both x and y, where y completes RHS (right handed system). V2=Vy sin phi y+|v1| cos theta x. Theta angle between V1 and V2. Phi angle between v2 and y. Known value and direction of V2 allows extraction of Vy, the needed parameter to form complete wind, by direct comparison.

Figure 14:
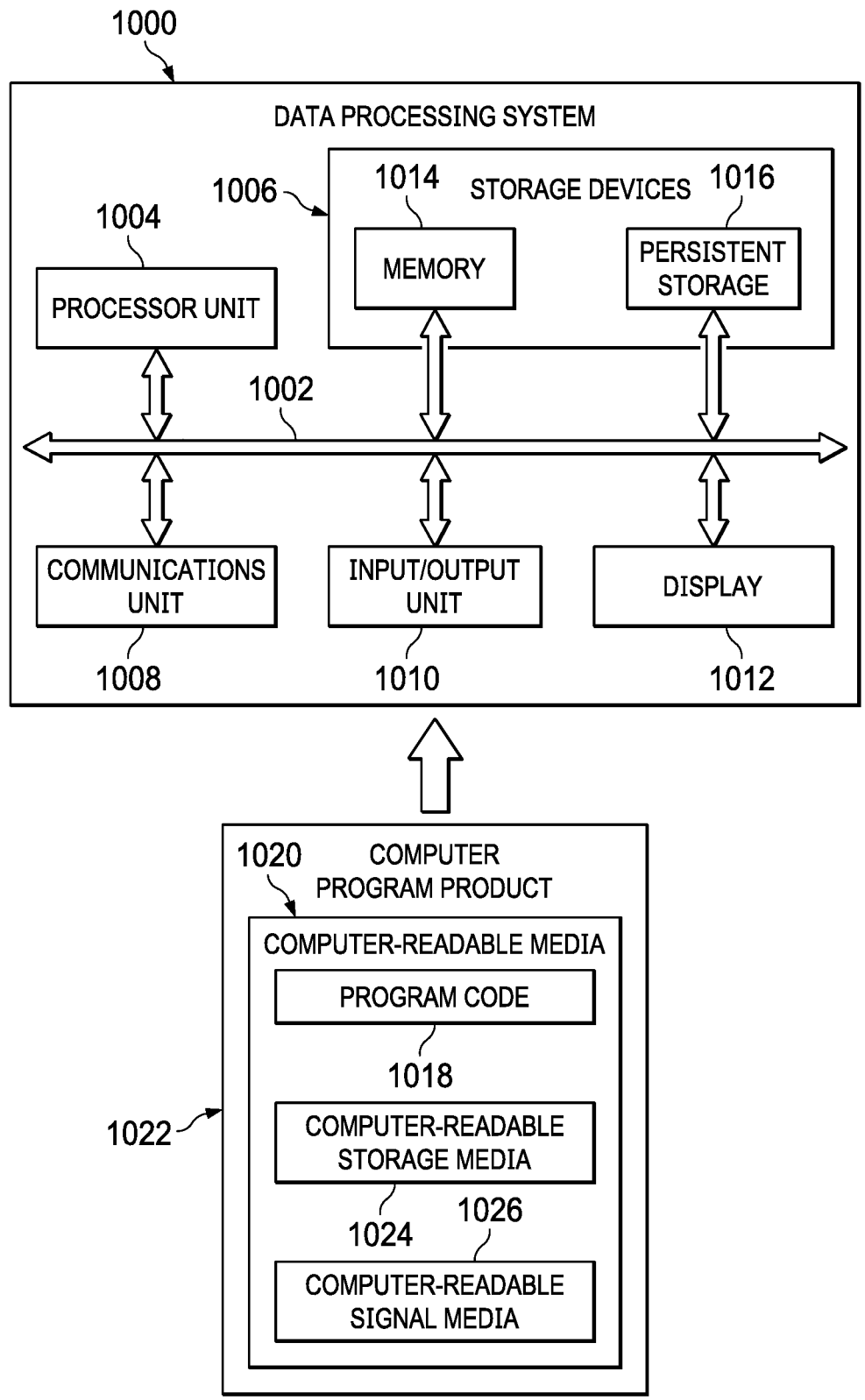
FIG. 14 is a block diagram of a data processing system is depicted in accordance with an illustrative embodiment.

Turning now to FIG. 14, a block diagram of a data processing system is depicted in accordance with an illustrative embodiment. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples.

In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 1418.

Alternatively, program code 1418 can be transferred to data processing system 1400 using a computer-readable signal media. The computer-readable signal media can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

Illustrative embodiments provide a neutral atmosphere instrument that obtains cross-track winds using peaks in pressure in time. Various embodiments use a rotating aperture under slots (anti-bafflers) rather than moving baffles. Wind arrival angles may be obtained using the absolute time location of the pressure peaks. Wind arrival angles may also be obtained using the time difference in pressure peak locations. Wind arrival angles may also be obtained by curve fitting measurements to a numerical instrument model. Rotating aperture, slot configuration, and wind determination using the difference in time (or curve fitting) produces an instrument that unambiguously knows when winds are normal to the instrument.

Illustrative embodiments provide a neutral instrument configured to operate in non-equilibrium. Geophysical results are obtained by fitting to a PDE description of gas flow rather than a static analytical description that relies on equilibrium behaviors.

In one illustrative embodiment, a scientific instrument for measuring neutral atmospheric conditions at satellite altitudes includes an ion gauge configured to measure ion pressure. The scientific instrument also includes a lid covering the ion gauge. The lid includes a plurality of slits. The scientific instrument also includes an aperture plate that includes an aperture opening. The aperture plate is configured to rotate such that each of the slits are periodically exposed by the aperture opening to allow a neutral beam flux to enter the ion gauge. In an illustrative embodiment, the scientific instrument also includes a data processing system coupled to the ion gauge, wherein the data processing system is configured to obtain pressure measurements from the ion gauge and determine cross-track winds using peaks in the pressure measurements in time. In an illustrative embodiment, wind arrival angles are obtained according to absolute time locations of the peaks pressure measurements. In an illustrative embodiment, wind arrival angles are obtained according to a time difference between locations of the peaks of the pressure measurements. In an illustrative embodiment, wind arrival angles are obtained according to curve fitting to pressure measurements. In an illustrative embodiment, wind arrival angles are obtained according to a time difference in peak locations of the pressure measurements. In an illustrative embodiment, the data processing system is configured to determine when winds are normal to the scientific instrument. In an illustrative embodiment, the aperture plate is located between the lid covering and the ion gauge. In an illustrative embodiment, a rotation rate of the aperture plate is increased or decreased according to at least one of mission requirements and expected signal levels.

In another illustrative embodiment, a method for determining neutral atmospheric conditions at satellite altitudes includes rotating an aperture plate containing an aperture opening such that a number of slits in an ion gauge covering are successively exposed allowing a neutral beam flux into an ion gauge. The method also includes measuring pressures in the ion gauge over time. The method also includes determining cross-track winds using peaks in the pressure measurements in time.

In yet another illustrative embodiment, a computer program product for determining neutral atmospheric conditions at satellite altitudes, the computer program product comprising a non-transitory computer readable storage medium having program instructions embodied therewith, the program instructions executable by a computer to cause the computer to perform a method. The method includes causing an aperture plate containing an aperture opening to rotate such that a number of slits in an ion gauge covering are successively exposed allowing a neutral beam flux into an ion gauge. The method also includes obtaining pressure measurements in the ion gauge over time. The method also includes determining cross-track winds using peaks in the pressure measurements in time.

The following references are incorporated herein by reference as if reproduced in their entirety:

[1] Spencer, N. W., H. B. Niemann, and G. R. Carignan (1973). The neutral-atmosphere temperature instrument. Radio Science, Vol 8 (4), 287-296.

[2] Heelis, R. A., Stoneback, R. A., Perdue, M. D. et al. Space Sci Rev (2017) 212: 615. https://doi.org/10.1007/s11214-017-0383-3

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A scientific instrument for measuring neutral atmospheric conditions at satellite altitudes, comprising:
   an ion gauge configured to measure ion pressure;
   a lid covering the ion gauge, the lid comprising a plurality of slits;
   a motor; and
   an aperture plate comprising an aperture opening, the aperture plate configured to be rotated by the motor such that each of the slits are periodically exposed by the aperture opening to allow a neutral beam flux to enter the ion gauge.

2. The scientific instrument of claim 1, further comprising:
   a data processing system coupled to the ion gauge, wherein the data processing system is configured to obtain pressure measurements from the ion gauge and determine cross-track winds using peaks in the pressure measurements in time.

3. The scientific instrument of claim 2, wherein wind arrival angles are obtained according to absolute time locations of the peaks of the pressure measurement.

4. The scientific instrument of claim 2, wherein wind arrival angles are obtained according to a time difference between locations of the peaks of the pressure measurements.

5. The scientific instrument of claim 2, wherein wind arrival angles are obtained according to a curve fitting to the pressure measurements.

6. The scientific instrument of claim 2, wherein the data processing system is configured to determine when winds are normal to the scientific instrument.

7. The scientific instrument of claim 1, wherein the aperture plate is located between the lid covering and the ion gauge.

8. The scientific instrument of claim 1, wherein a rotation rate of the aperture plate is increased or decreased according to at least one of mission requirements and expected signal levels.

9. A method for determining neutral atmospheric conditions at satellite altitudes, comprising: rotating an aperture plate containing an aperture opening such that a number of slits in an ion gauge covering in a scientific instrument are successively exposed allowing a neutral beam flux into an ion gauge; measuring pressures in the ion gauge overtime; and determining cross-track winds using peaks in the pressure measurements overtime.

10. The method of claim 9, wherein wind arrival angles are obtained according to absolute time locations of the peaks of the pressure measurements.

11. The method of claim 9, wherein wind arrival angles are obtained according to a time difference between locations of the peaks of the pressure measurements.

12. The method of claim 9, wherein wind arrival angles are obtained according to a curve fitting to the pressure measurements.

13. The method of claim 9, further comprising determining when winds are normal to the scientific instrument according to peak locations of the pressure measurement.

14. The method of claim 9, wherein a rotation rate of the aperture plate is increased or decreased according to at least one of mission requirements and expected signal levels.

15. A computer program product for determining neutral atmospheric conditions at satellite altitudes, the computer program product comprising a non-transitory computer readable storage medium having program instructions embodied therewith, the program instructions executable by a computer to cause the computer to perform a method comprising:
   causing an aperture plate containing an aperture opening to rotate such that a number of slits in an ion gauge covering in a scientific instrument are successively exposed allowing a neutral beam flux into the ion gauge;
   obtaining pressure measurements in the ion gauge overtime; and
   determining cross-track winds using peaks in the pressure measurements overtime.

16. The computer program product of claim 15, wherein wind arrival angles are obtained according to absolute time locations of the peaks of the pressure measurements.

17. The computer program product of claim 15, wherein wind arrival angles are obtained according to a time difference between locations of the peaks of the pressure measurements.

18. The computer program product of claim 15, wherein wind arrival angles are obtained according a curve fitting to the pressure measurements.

19. The computer program product of claim 15, further comprising determining when winds are normal to the scientific instrument according to peak locations of the pressure measurement.

20. The computer program product of claim 15, wherein a rotation rate of the aperture plate is increased or decreased according to at least one of mission requirements and expected signal levels.

* * * * *